United States Patent
Carralero et al.

(10) Patent No.: US 9,240,687 B2
(45) Date of Patent: Jan. 19, 2016

(54) SMART MICROGRID

(75) Inventors: Michael A. Carralero, Huntington Beach, CA (US); Jimmy M. Quiambao, Walnut, CA (US)

(73) Assignee: The Boeing Company, Chicago, IL (US)

( * ) Notice: Subject to any disclaimer, the term of this patent is extended or adjusted under 35 U.S.C. 154(b) by 862 days.

(21) Appl. No.: 12/897,664

(22) Filed: Oct. 4, 2010

(65) Prior Publication Data
US 2012/0080942 A1    Apr. 5, 2012

(51) Int. Cl.
| H02J 1/00 | (2006.01) |
| H02J 3/14 | (2006.01) |
| H02J 1/10 | (2006.01) |
| H02M 1/10 | (2006.01) |
| H02J 3/38 | (2006.01) |
| H02J 13/00 | (2006.01) |

(52) U.S. Cl.
CPC ............... *H02J 3/383* (2013.01); *H02J 3/386* (2013.01); *H02J 13/0006* (2013.01); *Y02E 10/563* (2013.01); *Y02E 10/763* (2013.01); *Y02E 40/72* (2013.01); *Y04S 10/123* (2013.01); *Y10T 307/352* (2015.04)

(58) Field of Classification Search
CPC .............................. H02J 3/386; Y04S 10/123
USPC ........... 307/11, 24, 29, 31–35, 38–41, 43, 82, 307/85, 86; 700/285, 286, 295
See application file for complete search history.

(56) References Cited

U.S. PATENT DOCUMENTS

| 7,183,667 | B2 * | 2/2007 | Colby | H02J 3/42 307/19 |
| 2002/0036430 | A1 * | 3/2002 | Welches | F02G 1/043 307/18 |
| 2007/0010916 | A1 * | 1/2007 | Rodgers | H02J 3/14 700/295 |
| 2008/0143304 | A1 * | 6/2008 | Bose | H02J 3/06 323/205 |
| 2008/0278000 | A1 * | 11/2008 | Capp | H02J 3/04 307/21 |
| 2009/0027932 | A1 * | 1/2009 | Haines | H02J 9/062 363/95 |
| 2009/0157529 | A1 * | 6/2009 | Ehlers et al. | 705/26 |

(Continued)

FOREIGN PATENT DOCUMENTS

| JP | 2008043170 A | 2/2008 |
| JP | 2008104269 A | 5/2008 |
| JP | 2008271625 A | 11/2008 |

OTHER PUBLICATIONS

Decision of Rejection mailed Apr. 21, 2015 issued in Japanese Application No. 2011-210246, with English translation, 2 pages.

*Primary Examiner* — Rexford Barnie
*Assistant Examiner* — Rasem Mourad
(74) *Attorney, Agent, or Firm* — Toler Law Group, PC (57) ABSTRACT

Described herein are embodiments of microgrid systems which may be used as stand-alone systems or may be connected to a larger, integrated power supply system. In some embodiments, a system comprises a smart microgrid system comprising at least one electrical power bus connectable to at least one input power source by one or more switchable connections, a communication network coupled to the smart microgrid system, and a controller coupled to the communication network. In some embodiments the controller comprises logic to monitor power outputs from the at least one input power source, to monitor one or more power loads coupled to the at least one electrical power bus, and to selectively connect one or more of the input power sources to the at least one electrical power bus.

24 Claims, 5 Drawing Sheets

(56) References Cited

U.S. PATENT DOCUMENTS

| | | | | |
|---|---|---|---|---|
| 2010/0207456 A1* | 8/2010 | Lasseter | ............. | H02J 3/38 307/85 |
| 2011/0055036 A1* | 3/2011 | Helfan | ............. | G06Q 30/04 705/26.1 |
| 2011/0153110 A1* | 6/2011 | Drake | ............. | A47L 15/0047 700/296 |

* cited by examiner

SMART MICROGRID

BACKGROUND

The subject matter described herein relates to electrical power distribution, and more particularly to intelligent microgrids which may be deployed alone or in combination to distribute electrical power.

Existing microgrid distribution systems are essentially disconnected islands at a facility or in an electrical distribution system that contain at least one distributed resource and associated loads. These microgrids may be connected to a broader utility grid, but in instances like blackouts, these microgrids switch to backup mode, disconnect from the utility, and continue to generate electricity to specific loads.

For such microgrids to work properly, a switch opens during upstream conditions, and the energy resources must be able to carry the load on the islanded section. This includes maintaining suitable voltage and frequency levels for all loads in the island served by the microgrids. Depending on the switch technology utilized, momentary interruptions may occur during transfer from grid-connected to power back-up mode.

More recent applications include hybrid islanded microgrids which combine renewable energy sources and diesel generators, with or without storage batteries. However, injecting renewable energy resources on a diesel-powered isolated grid does not yield a large positive impact, as diesel generators perform poorly at partial load. One alternative is to allow the renewable energy resources, with energy storage components, to stop the generators periodically. This approach will immensely reduce both the cost and the carbon footprint of the generator in the environment.

In short, existing microgrids are not intended to work in an isolated grid architecture where two or more of these resources are paralleled and one of these resources acting as the primary power source. The drawback is a technically complex power interface associated with load sharing, power quality, and synchronization of power supplied.

Accordingly, there remains a need in the art for an innovative power interface and associated control system for a smart, robust microgrid architecture that provides a high level of flexibility and adaptability, and that can operate in either grid-tied or isolated grid mode.

BRIEF DESCRIPTION OF THE DRAWINGS

The detailed description is described with reference to the accompanying figures.

SUMMARY

Described herein are embodiments of microgrids which may be coupled to a shared electrical grid, and systems and methods for managing such microgrids. In one embodiment a smart microgrid system comprises at least one electrical power bus connectable to at least one input power source by one or more switchable connections, a communication network coupled to the smart microgrid system, and a controller coupled to the communication network. In some embodiments the controller comprises logic to monitor power outputs from at least one input power source, to monitor one or more power loads coupled to the at least one electrical power bus, and to selectively connect one or more of the input power sources to the at least one electrical power bus.

In another embodiment, a method to manage one or more microgrid coupled to a shared electrical grid comprises measuring one or more local loads on the one or more microgrids, measuring one or more shared loads on the shared electrical grid, assigning a prioritization scheme to the one or more local loads and the one or more shared loads, and regulating power drawn from the one or more microgrids to the shared electrical grid in accordance with the prioritization scheme.

In another embodiment a controller to manage operations of a smartgrid system comprises logic to monitor power outputs from at least one input power source, monitor one or more power loads coupled to the smartgrid system, and regulate the power drawn from one or more of the input power sources to the smartgrid system.

DETAILED DESCRIPTION

Described herein are embodiments microgrids and systems and methods for managing microgrids coupled to a shared electrical power grid. In the following description and/or claims, the terms "coupled" and/or "connected," along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct physical contact with each other, but yet may still cooperate and/or interact with each other. For example, "coupled" may mean that two or more elements do not contact each other but are indirectly joined together via another element or intermediate elements.

Figure 1:
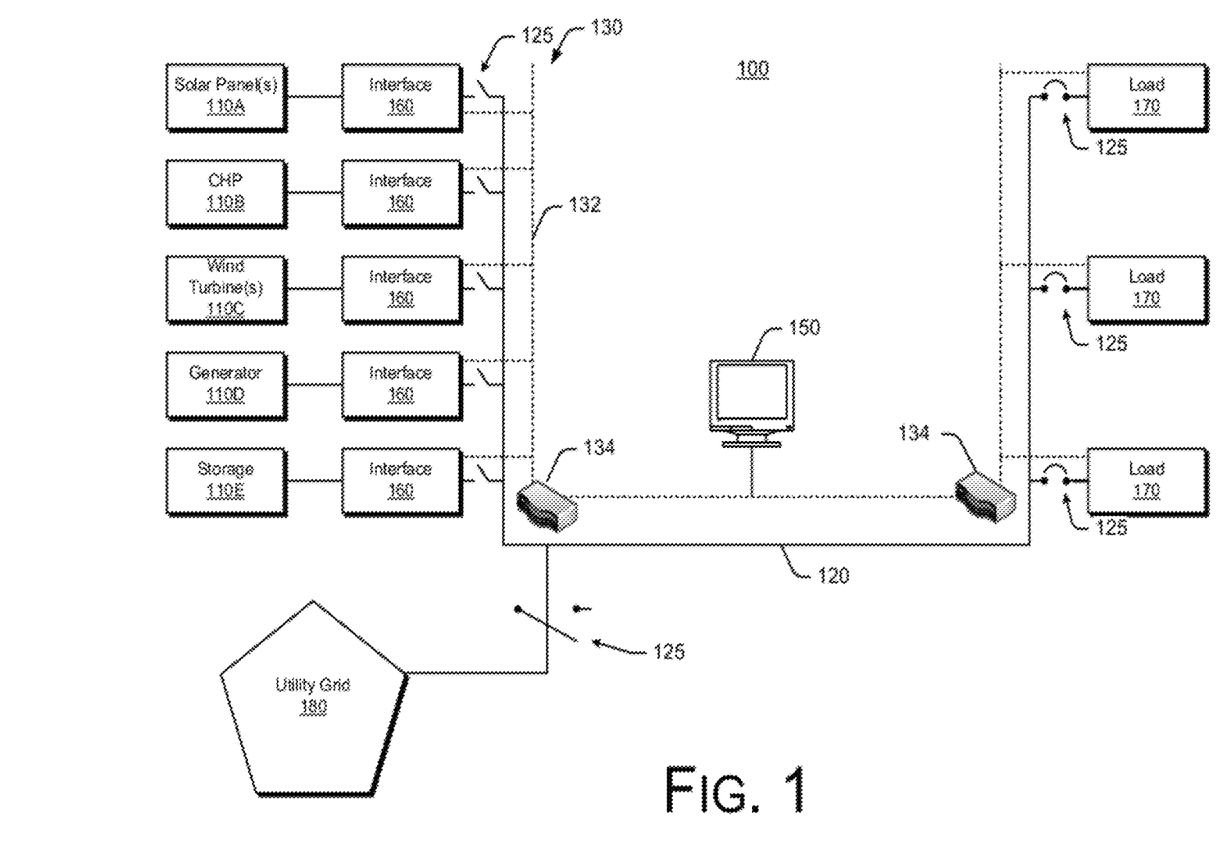
FIG. 1 is a schematic illustration of various components of a power system, according to embodiments.

FIG. 1 is a schematic illustration of various components of a power system, according to embodiments. Referring to FIG. 1, in some embodiments a power system 100 may comprise one or more power sources 110 coupled to a shared electrical power bus 120 by one or more switchable connections 125. An interface 160 may be interposed between the power sources 110 and the connection 125. One or more loads 170 are coupled to the electrical power bus 120 also by a switchable connection 125. A communion network comprising a communication bus 132, and one or more routers 134 provides a communication link between a control system 150 and the various interfaces 160 and loads 170. Routers 134 serve to route communication messages, e.g., regarding power conditioning and quality management functions, between the various elements of communication network 130. By way of example, the routers 134 may provide a presence on the network where the controller can selectively address each load switch and interface switch to configure the power network. The system 100 may be connected to an external utility grid 180 via a switchable connection 125.

The power sources 110 may include one or more solar panel sources 110A, a combined heat/power source 110B, one or more wind turbines 110C, one or more generators 110D, and one or more power storage devices 110E. Power sources 110A-110E may be referred to collectively herein by the reference numeral 110.

Figure 2:
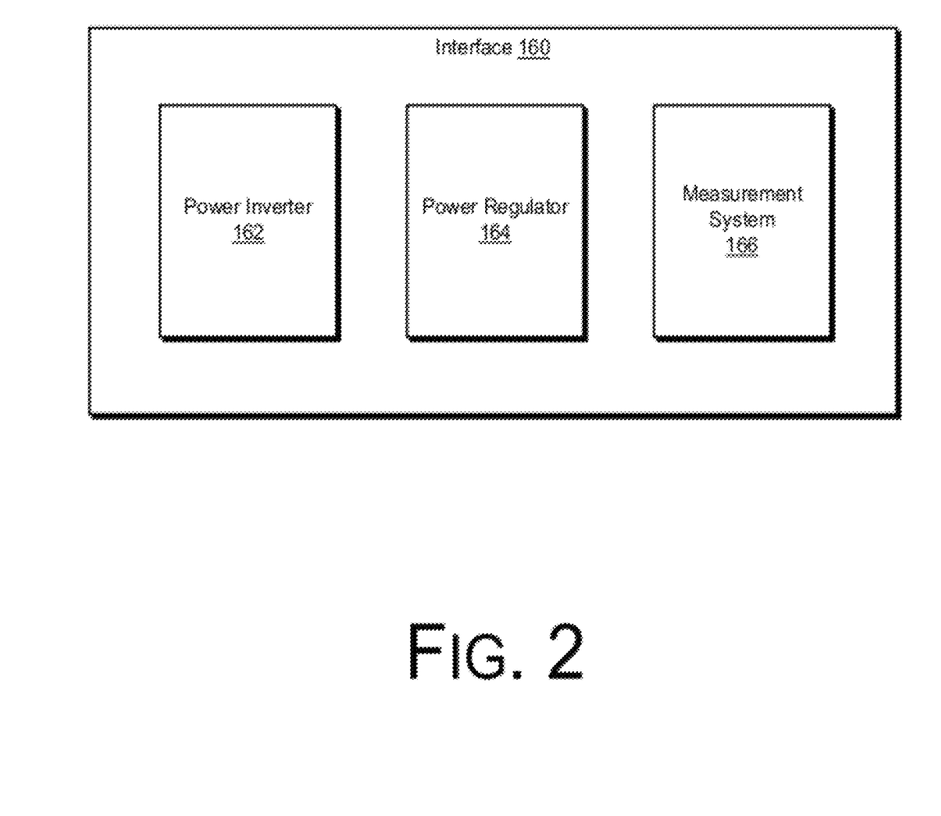
FIG. 2 is a schematic illustration of various components of an interface, according to embodiments.

Interfaces 160 provide a power conditioning and quality management function. FIG. 2 is a schematic illustration of various components of an interface 160, according to embodiments. Referring briefly to FIG. 2, in some embodiments the interfaces 160 comprise a power inverter 162, a power regulator 164, and a measurement system 166.

The power inverter 162 transforms direct current (dc) power into a quasi-sinusoidal or pure sine wave generator alternating current (ac) power. The input to power inverter represents the total energy harvested or stored from the power source 110. For example, a dc input may be a clean signal coming from the power source 110 which can range from 100Vdc to 200Vdc. The power inverter may comprise a sine wave generator, the output frequency of which is phased-locked to the output power frequency, while the amplitude is referenced to the power output when operating as a slave. In other operating modes, such as when the inverter is operated as an isolated grid primary power source mode, the output may be set as a voltage source which is referenced from the dc fixed voltage generator and the frequency of which is referenced from the quasi-sinusoidal waveform generator.

The power regulator 164 regulates the output power at the interface when connected to linear and non-linear loads, and during overload and under-load conditions. Power regulator 164 may also include compensators to help balance the line due to destabilizing effects of reactive elements and transients.

The measurement system 166 acts as "net metering" module when the system 100 is coupled to the utility grid 180. When the power system of 100 is coupled to the utility grid 180, all the energy resources are slaved to the utility grid 180. Thus, the power interfaces 160 see an infinite load and an ideal constant voltage source. As a result, each power source 110 operates at maximum point power transfer (MPPT). However, when operated in an isolated grid, a more complex power algorithm may be used to achieve MPPT and to accurately supply local loads first, then shared loads second or vice versa. To achieve all these capabilities, the measurement system 166 continuously monitors and performs measurements on the energy harvest, energy forecasted, local loads, and shared load demands for the system 100. The overall system load demands may be determined in real time, as well as the overall available shared power. When necessary, or when the available forecasted power is less than the overall load demand, the power system 100 can prioritize loads depending on the relative importance of the load. Less important loads may be disconnected or may have a maximum power limit available.

Referring back to FIG. 1, in some embodiments the communication network 130 may be a local area network (LAN). The controller 150, each interface 160 and each load 170 may be coupled to the LAN 130 and each may be assigned a unique network node identifier, e.g., in an interne protocol (IP) network each node may be assigned an IP address. In some embodiments the IP addresses of the various network nodes may be openly addressable by entities outside the system 100, while in other embodiments the IP addresses of the various network nodes may be maintained within the system 100.

Figure 3:
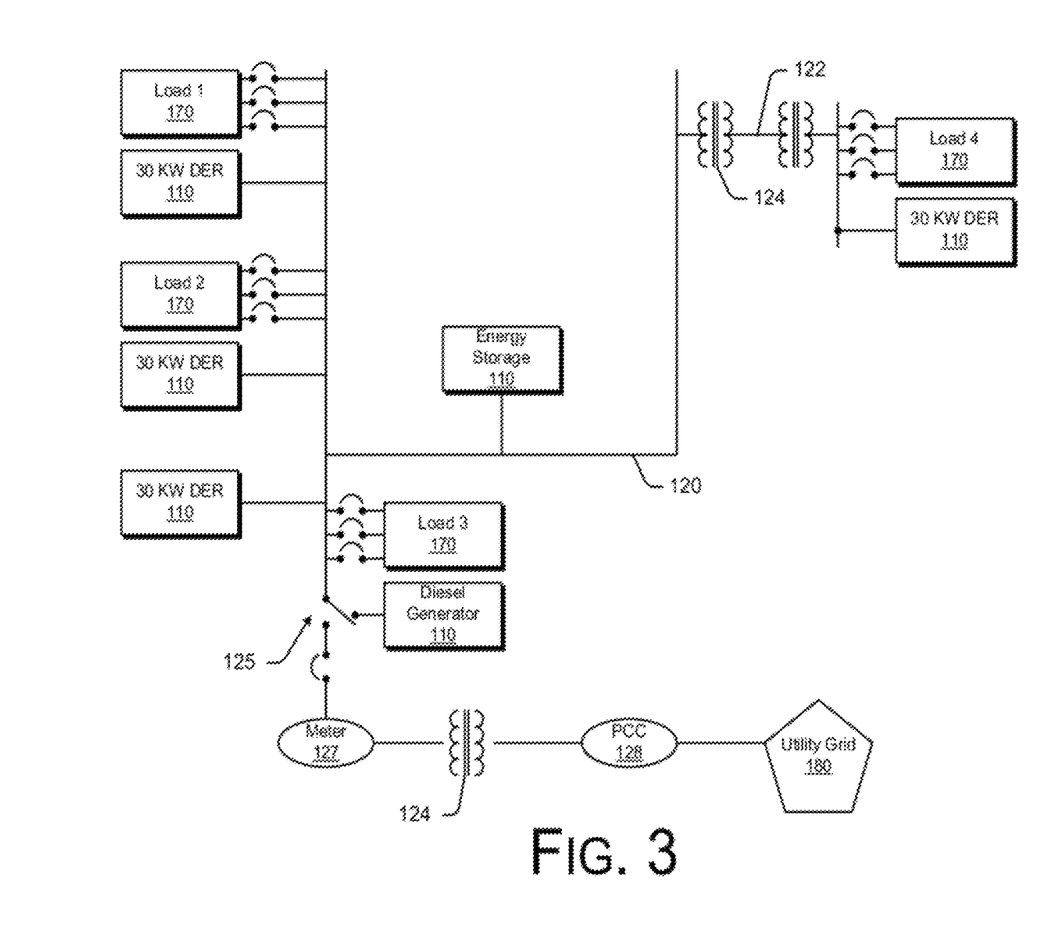
FIG. 3 is a schematic illustration of various components of a power system, according to embodiments.

FIG. 3 is a quasi-geographical schematic illustration of various components of a power system, according to embodiments. The embodiment depicted in FIG. 3 illustrates three loads 170 coupled directly to shared electrical bus 120 and a fourth load 170 coupled to the shared bus 120 via transmission lines 122 and transformers 124. The various input power sources are indicated by reference numerals 110. A 30 KW distributed energy resource (DER) coupled to the shared power bus 120 may be located physically proximate to the first load 170. Similarly, second and third loads 170 and second and third 30 KW DER 170 are coupled to the shared electrical bus 120. An energy storage device 110 is coupled to the shared electrical bus 120 and a diesel generator 110 is selectively connectable to the shared electrical bus 120 via a switchable connection 125.

The shared utility electrical bus 120 is coupled to the utility grid 180 via switched connection 125. One or more transformers 124 and a PCC (Point of Common Contact) 128 may be interposed between the switchable connection 125 and the utility grid 180. Further, a power meter 127 may be included to meter power drawn by the system 100.

Figure 4:
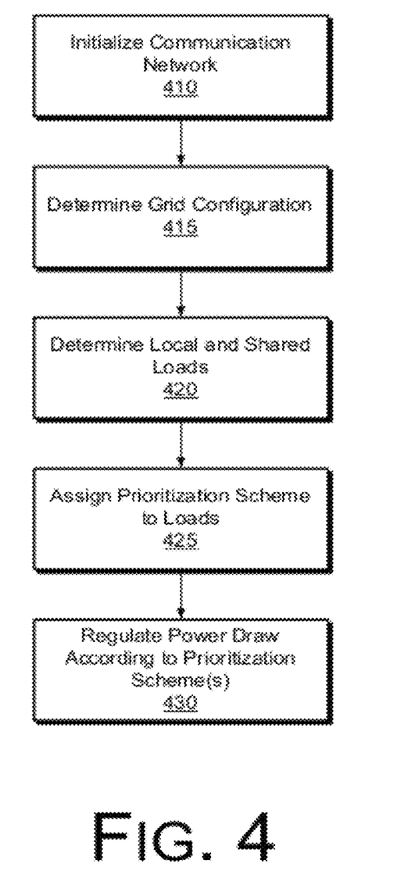
FIG. 4 is a flowchart illustrating operations in a method to manage a microgrid coupled to a shared electrical grid, according to embodiments.

In some embodiments the controller 150 and the measurement system 166 cooperate to manage operations of the smart microgrid system 100. The controller 150 provides the central control operations of the management process. FIG. 4 is a flowchart illustrating operations in a method to manage a microgrid coupled to a shared electrical grid, according to embodiments. Referring to FIG. 4, the controller 150 initializes the communication network 130 at operation 410. In some examples the controller 150 may configure the IP addresses of the network nodes associated with the various elements of the system 100. In some embodiments all elements of the system 100 are coupled to the communication network 130, however the network nodes for the elements of the system 100 may have access to the Internet except through a common redundant port controlled by the LAN. In addition, because the elements are independently addressed, a single element failure will not disable other elements of the network from operating. In some embodiments, Internet access to the LAN may be encrypted and secured, and no control elements can be accessed from the Internet; only status and measurement information are accessible. In other embodiments status and measurement information may also be encrypted.

At operation 415 the controller determines the grid configuration. By way of example, the controller 150 may determine the energy consumed by each load 170, either directly or by communicating with a local controller coupled to the load 170. The controller 150 may distinguish local loads, i.e., loads that are to be supplied by local power sources, from shared loads, i.e., loads that are to be supplied by remote power sources or from the power grid 180 in operation 420. The controller 150 may also forecast power consumption by the respective loads 170 and power generation capabilities of the respective power sources 110.

At operation 425 the controller 150 may assign a prioritization scheme to the load demands from the various loads 170. By way of example, some loads 170 may be considered critical and may be entitled to a maximum power input before power may be directed to another load 170. Other loads may be designated as secondary, entitled to power only when available.

At operation 430 the controller regulates power draw according to the prioritization scheme(s) established in operation 425. By way of example, in some embodiments the controller 150 may communicate with the interface 160 to monitor power outputs from the various input power sources 110. Similarly, the controller 150 may monitor the power loads 170 coupled to the electrical power bus 120, and regulate the power drawn from one or more of the input power sources to the at least one electrical power bus 120 in accordance with the prioritization scheme(s). By way of example, in some embodiments the controller may selectively disconnect a power load 170 from the network, and/or add another input power source 110 to the network.

In some embodiments the controller 150 may completely disconnect a power source 110 from the electrical power bus 120, e.g., by switching the switchable connection 125 between a first state in which an electrical connection is established between the at least one input power source 110 and the at least one electrical power bus 120 and a second state in which an electrical connection is severed between the at least one input power source 110 and the at least one electrical power bus 120. In other embodiments measurement system 166 in the interface 160 monitors a power requirement of one or more loads coupled to the electrical power bus 120, and manages the at least one power regulator 164 to draw a predetermined amount of power from the at least one input power source 110.

In addition to power management, the controller 150 may include a system health management operation that monitors every smart elements of the network to aid in the maintenance and to aid in the real-time graceful degradation of the system during its lifetime. Also, the software of command and control can be loaded into any power interfaces 160 to provide redundancy.

Figure 5:
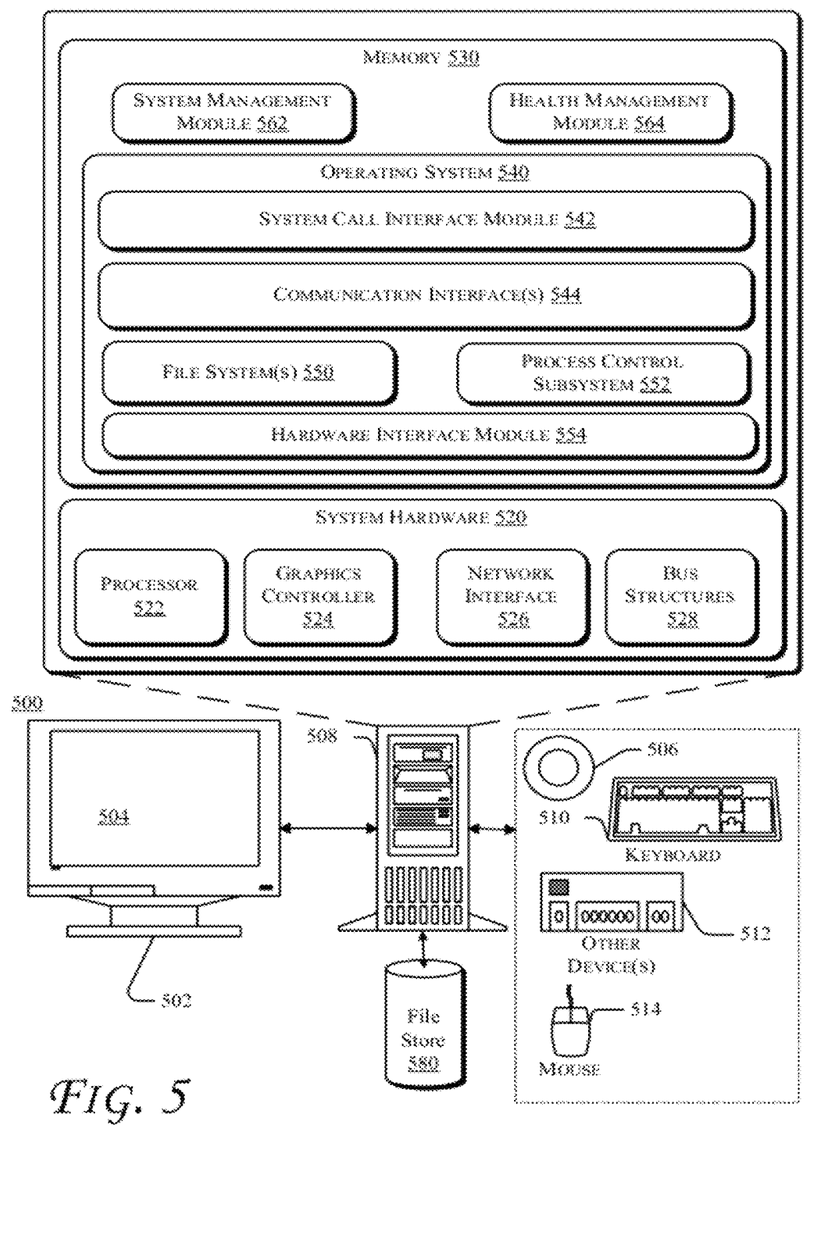
FIG. 5 is a schematic illustration of an electronic device, according to embodiments.

FIG. 5 is a schematic illustration of a computing system 500 that may be used in conjunction with a system 100. In some embodiments, system 500 includes a computing device 508 and one or more accompanying input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 500 to receive input from a user.

The computing device 508 includes system hardware 520 and memory 530, which may be implemented as random access memory and/or read-only memory. A file store 580 may be communicatively coupled to computing device 508. File store 580 may be internal to computing device 508 such as, e.g., one or more hard drives, CD-ROM drives, DVD-ROM drives, or other types of storage devices. File store 580 may also be external to computer 508 such as, e.g., one or more external hard drives, network attached storage, or a separate storage network.

System hardware 520 may include one or more processors 522, video controllers 524, network interfaces 526, and bus structures 528. In one embodiment, processor 522 may be embodied as an Intel® Pentium IV® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics controller 524 may function as an adjunction processor that manages graphics and/or video operations. Graphics controller 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 528. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 508. In one embodiment, operating system 540 includes a hardware interface module 554 that provides an interface to system hardware 520. In addition, operating system 540 may include a file system 550 that manages files used in the operation of computing device 508 and a process control subsystem 552 that manages processes executing on computing device 508. Further, memory module 530 may comprise a system management module 562 to implement the power management operations described with reference to FIG. 4, and a health management module 564 to implement health management functions.

Operating system 540 may include (or manage) one or more communication interfaces 544 that may operate in conjunction with system hardware 520 to transceive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

Thus, described herein are embodiments of displays which may be used in high-pressure environments, e.g., underwater. Also described are electronic device such as computer systems to which such displays may be coupled. Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A smart microgrid system comprising:
an electrical power bus connectable to a first input power source via a first switchable connection, wherein the first switchable connection is connected to the first input power source via an interface, wherein the interface provides power conditioning between the first input power source and the electrical power bus, wherein the interface includes an inverter that operates in a first mode when coupled to the electrical power bus and operates in a second mode when not coupled to the electrical power bus, wherein the inverter includes a sine wave generator that generates an output wave with an output amplitude that is based on a power amplitude of the electrical power bus when the inverter is operating in the first mode, and wherein the output amplitude is based on an input amplitude of power from the first input power source when the inverter is operating in the second mode;

a communication network coupled to the first input power source; and a controller coupled to the communication network, wherein the controller comprises logic configured to:
monitor power output by the first input power source to forecast available power;
monitor power consumed by one or more power loads coupled to the electrical power bus to forecast power consumption of the one or more power loads;
regulate power drawn from the first input power source subsequent to forecasting the available power and forecasting the power consumption; and
limit an amount of power provided to a first load to a particular non-zero amount of power based on a priority of the first load.

2. The smart microgrid system of claim 1, wherein the logic is further configured to configure internet protocol addresses of network nodes associated with the electrical power bus, the first input power source, and the controller.

3. The smart microgrid system of claim 1, wherein a maximum point power transfer characteristic of the first input power source changes to a first value from a second value when the first input power source is connected to the electrical power bus, and wherein the maximum point power transfer characteristic of the first input power source changes from the second value to the first value when the first input power source is disconnected from the electrical power bus.

4. The smart microgrid system of claim 1, wherein the interface comprises:
a power regulator; and
a measurement system.

5. The smart microgrid system of claim 4, wherein the inverter is configured to transform direct current electrical power generated by the first input power source to alternating current electrical power, and wherein the power regulator is configured to regulate the power drawn from the first input power source at the interface.

6. The smart microgrid system of claim 4, wherein the measurement system comprises logic configured to:
monitor a power requirement of the one or more power loads coupled to the electrical power bus; and
manage the power regulator to draw a particular amount of power from the first input power source.

7. The smart microgrid system of claim 4, wherein the measurement system comprises logic configured to monitor power data including energy harvest associated with the first input power source.

8. The smart microgrid system of claim 1, wherein the controller further comprises logic configured to:
initialize the communication network;
determine a grid configuration for the first input power source and the one or more power loads;
determine an average shared demand and an average local load demand; and
perform a state of health check routine for the first input power source.

9. The smart microgrid system of claim 1, wherein the controller further comprises logic configured to assign the first input power source as a primary power source and assign a second input power source as a secondary power source for a particular power load of the one or more power loads.

10. The smart microgrid system of claim 1, wherein the communication network is an Internet Protocol local-area network.

11. A method comprising:
measuring power generated by a first input power source to forecast available power, wherein the first input power source is connected to an electrical power bus of a microgrid via a first switchable connection, wherein a communication network is connected to the microgrid, wherein the first switchable connection is connected to the first input power source via an interface, wherein the interface provides power conditioning between the first input power source and the electrical power bus, wherein the interface includes an inverter that operates in a first mode when coupled to the electrical power bus and operates in a second mode when not coupled to the electrical power bus, wherein the inverter includes a sine wave generator that generates an output wave with an output amplitude that is based on a power amplitude of the electrical power bus when the inverter is operating in the first mode, and wherein the output amplitude is based on an input amplitude of power from the first input power source when the inverter is operating in the second mode;
measuring power consumed by one or more loads of the microgrid to forecast power consumption of the one or more loads;
assigning a prioritization scheme to the one or more loads subsequent to forecasting the available power and forecasting the power consumption;
regulating power drawn from the first input power source in accordance with the prioritization scheme; and
limiting an amount of power provided to a first load of the one or more loads to a particular non-zero amount of power based on a priority of the first load.

12. The method of claim 11, further comprising initializing the communication network.

13. The method of claim 11, further comprising selectively disconnecting a second load of the one or more loads from the microgrid based on a second priority of the second load.

14. The method of claim 11, wherein regulating power drawn from the first input power source comprises drawing a particular amount of power from the first input power source.

15. The method of claim 11, further comprising monitoring power data including energy harvest associated with the first input power source, local load demands for the microgrid, and shared load demands for the microgrid.

16. The method of claim 11, further comprising performing a state of health check routine for the microgrid.

17. An apparatus comprising:
a controller configured to manage a smartgrid system, the controller comprising logic configured to:
monitor power output by an input power source coupled to the smartgrid system to forecast available power, wherein the smartgrid system is connected to the input power source via an interface, wherein the interface provides power conditioning between the input power source and the smartgrid system, wherein the interface includes an inverter that operates in a first mode when coupled to the smartgrid system and operates in a second mode when not coupled to the smartgrid system, wherein the inverter includes a sine wave generator that generates an output wave with an output amplitude that is based on a power amplitude of the smartgrid system when the inverter is operating in the first mode, and wherein the output amplitude is based on an input amplitude of power from the input power source when the inverter is operating in the second mode;

monitor power consumed by one or more power loads coupled to the smartgrid system to forecast power consumption of the one or more power loads;

regulate power drawn from the input power source based on the available power and the power consumption; and limit an amount of power provided to a first load to a particular non-zero amount of power based on a priority of the first load.

18. The apparatus of claim 17, wherein the smartgrid system comprises:
an electrical power bus connectable to the input power source by a switchable connection; and
a communication network coupled to the input power source and the one or more power loads.

19. The apparatus of claim 18, wherein the communication network comprises a router, and wherein the controller is configured to manage operation of the router.

20. The smart microgrid system of claim 1, wherein forecasting the power consumption of the one or more loads includes forecasting a first power consumption amount of the first load, and wherein the particular non-zero amount of power is less than the first power consumption amount.

21. The smart microgrid system of claim 1, wherein the electrical power bus is connectable to multiple input power sources via multiple switchable connections, and wherein the controller further comprises logic configured to regulate power drawn from each input power source of the multiple input power sources at a corresponding power bus interface coupled between the input power source and a corresponding switchable connection.

22. The method of claim 11, wherein forecasting the power consumption of the one or more loads includes forecasting a first power consumption amount of the first load, and wherein the particular non-zero amount of power is less than the first power consumption amount.

23. The method of claim 11, further comprising:
providing power to a second load of the one or more loads in accordance with the prioritization scheme;
determining whether available power remains after providing power to the second load; and
providing power to a third load of the one or more loads responsive to determining that available power remains after providing power to the second load.

24. The method of claim 11, further comprising connecting the electrical power bus to a second input power source via a second switchable connection based on the available power and the power consumption.

* * * * *